(12) United States Patent
Meguriya

(10) Patent No.: US 6,261,214 B1
(45) Date of Patent: Jul. 17, 2001

(54) SILICONE RUBBER COMPOSITION AND HEAT FIXING ROLL

(75) Inventor: Noriyuki Meguriya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/426,136

(22) Filed: Oct. 25, 1999

(30) Foreign Application Priority Data

Nov. 6, 1998 (JP) .................................................. 10-316055

(51) Int. Cl.$^7$ ....................................................... B25F 5/02
(52) U.S. Cl. .................................. 492/56; 492/46; 492/53
(58) Field of Search ................................ 492/46, 53, 56; 29/895.32; 399/330

(56) References Cited

U.S. PATENT DOCUMENTS

| | | |
|---|---|---|
| 4,433,069 | 2/1984 | Harper . |
| 4,738,988 | 4/1988 | Dietlein . |
| 5,246,973 | 9/1993 | Nakamura et al. . |
| 5,750,581 | 5/1998 | Brennenstuhl et al. . |
| 5,895,711 | * 4/1999 | Yamaki et al. . |

FOREIGN PATENT DOCUMENTS

| | | | |
|---|---|---|---|
| 0843236A2 | * | 5/1998 | (EP) . |
| 57-149354A | * | 9/1982 | (JP) . |
| 61-158362A | * | 7/1986 | (JP) . |
| 62-256863A | * | 11/1987 | (JP) . |
| 06167900A | * | 6/1994 | (JP) . |

* cited by examiner

Primary Examiner—I Cuda Rosenbaum
(74) Attorney, Agent, or Firm—Birch, Stewart, Kolasch, & Birch, LLP

(57) ABSTRACT

A silicone rubber composition comprising 100 parts by weight of a thermosetting organopolysiloxane composition and 0.1–200 parts by weight of a hollow filler in the form of microballoons having a mean particle size of 10–200 μm is suitable for forming a silicone rubber layer around a shaft to provide a heat fixing roll.

11 Claims, No Drawings

SILICONE RUBBER COMPOSITION AND HEAT FIXING ROLL

This invention generally relates to heat fixing rolls in heat fixing units in electrostatic recording apparatus such as electrophotographic copiers, printers and facsimile machines and more particularly, to silicone rubber compositions for use in forming the heat fixing rolls.

BACKGROUND OF THE INVENTION

Thermosetting liquid silicone rubber compositions are used in a variety of fields because they are readily moldable and after molding, have improved heat resistance and electrical insulating properties. Recently they are widely used in fixing rolls in plain paper copiers (PPC), laser beam printers and facsimile machines because of their heat resistance and parting properties.

Apparatus utilizing the electrophotographic process require means for transferring a toner image from a photoconductor drum to a paper sheet and fixing the toner image to the sheet. The most commonly used means for fixing the toner image is by passing a toner image-bearing paper sheet between a heating roll and a pressure roll rotating in close contact, thereby thermally fusing the toner image to the sheet for fixation. In this heat fusing process, the response of a copier or printer is generally accelerated by increasing the heat conductivity of the roll material. The roll materials having a high heat conductivity, however, naturally show rapid heat release. The current drive toward size reduction and cost reduction arises a need for a material having a low heat conductivity and hence, good heat insulation.

One typical such material is silicone rubber foam utilizing the low heat conductivity of gas. The silicone rubber foam is typically prepared by adding pyrolytic blowing agents. Alternatively, a silicone rubber composition is molded and cured in such a manner that hydrogen gas may evolve upon curing as a by-product whereby a foam is obtained. However, the addition of pyrolytic blowing agents has the problem that decomposition gases are toxic and odorous. Where a platinum catalyst is used as the curing catalyst, undesirably the blowing agent acts to retard curing. The method of utilizing hydrogen gas evolving upon curing suffers from the problems that hydrogen gas is explosive and the uncured composition requires careful handling during storage. Where silicone rubber foam is formed by injection molding a silicone rubber composition in a mold whereby the rubber is expanded in the mold, it is difficult to produce a silicone rubber foam having uniform micro-cells.

SUMMARY OF THE INVENTION

An object of the invention is to provide a silicone rubber composition which cures into silicone rubber having a low heat conductivity without raising the above-mentioned problems, and thus suitable for use in heat fixing rolls. Another object of the invention is to provide a heat fixing roll using the silicone rubber composition.

In a first aspect, the invention provides a silicone rubber composition comprising 100 parts by weight of a thermosetting organopolysiloxane composition and 0.1 to 200 parts by weight of a hollow filler having a mean particle size of up to 200 $\mu$m. This composition cures into silicone rubber having a low heat conductivity and good heat insulation and thus suitable as a silicone rubber layer on a heat fixing roll.

In a second aspect, the invention provides a heat fixing roll comprising a roll shaft, a silicone rubber layer formed on the outer circumferential surface of the shaft, and optionally a fluoro-resin layer surrounding the silicone rubber layer. The silicone rubber layer is a cured product of the silicone rubber composition defined above.

DESCRIPTION OF THE PREFERRED EMBODIMENT

The silicone rubber composition for a heat fixing roll according to the invention is based on a thermosetting organopolysiloxane composition, in which a hollow filler is blended. The hollow filler acts such that gas-filled cells are created in a cured part to reduce the heat conductivity thereof like sponge rubber.

Exemplary hollow fillers include glass balloons, silica balloons, carbon balloons, alumina balloons, zirconia balloons, shirasu (or silicious) balloons, and plastic balloons such as phenolic resin balloons, acrylonitrile balloons, and vinylidene chloride resin balloons. Preferably, the hollow filler is formed of such a material that the hollow filler itself may have elasticity. Therefore, the preferred hollow filler is in the form of microballoons of a thermoplastic resin, especially microballoons formed of a homopolymer of vinylidene chloride, acrylonitrile, methacrylonitrile, an acrylate, or a methacrylate, or a copolymer of two or more of these monomers. An inorganic filler may be attached to a surface of such a hollow resin filler for the purpose of imparting strength thereto.

In order that the composition be reduced in heat conductivity to a full extent, the hollow filler should preferably have a true specific gravity of 0.01 to 1.0, more preferably 0.01 to 0.5, and especially 0.02 to 0.5. A filler with too low a true specific gravity would be difficult to formulate and handle, have an insufficient pressure resistance or strength to prevent crushing upon molding, and provide an insufficient weight reduction and heat conductivity reduction. A too high true specific gravity means that the material portion (or wall) of the hollow filler accounts for a greater proportion of the filler, which would provide an insufficient decline of heat conductivity.

The hollow filler In the form of microballoons has a mean particle size of up to 200 $\mu$m, preferably up to 150 $\mu$m, and more preferably up to 90 $\mu$m. Microballoons having a too large mean particle size can be crushed by the injection pressure during molding, leading to the undesired problems that the filled composition has an increased heat conductivity and an increased surface roughness when molded into a roll. The lower limit of the mean particle size of the hollow filler is not critical although it is usually 10 $\mu$m. and especially 20 $\mu$m. The mean particle size can be determined as a weight average value (or median diameter) by laser light diffractometry.

An appropriate amount of the hollow filler blended is 0.1 to 200 parts, preferably 0.2 to 150 parts, and more preferably 0.5 to 100 parts by weight per 100 parts by weight of the thermosetting organopolysiloxane composition. The hollow filler is preferably blended in an amount of 10 to 80% by volume, especially 15 to 75% by volume of the silicone rubber composition. A too low volumetric proportion of the hollow filler would lead to an insufficient decline of heat conductivity. With a too high volumetric proportion of the hollow filler, blending is difficult, and molded parts would lose rubber elasticity and become brittle.

The thermosetting organopolysiloxane composition may be any well-known thermosetting organopolysiloxane composition used in forming a silicone rubber layer on a heat fixing roll, which may be either of the organic peroxide curing type or of the addition reaction curing type. Preferred is a thermosetting organopolysiloxane composition of the addition reaction curing type, comprising as main components, (A) 100 parts by weight of an organopolysiloxane containing at least two alkenyl groups each attached to a silicon atom in a molecule, (B) 0.1 to 50 parts by weight of an organohydrogenpolysiloxane containing at least two hydrogen atoms each attached to a silicon atom in a molecule, and (C) a catalytic amount of an addition reaction catalyst.

Component (A) is an organopolysiloxane having on the average at least two alkenyl radicals in a molecule, represented by the average compositional formula (1).

$$R^1_a SiO_{(4-a)/2} \tag{1}$$

Herein, $R^1$ is a substituted or unsubstituted monovalent hydrocarbon radical having 1 to 10 carbon atoms, preferably 1 to 8 carbon atoms. The $R^1$ radicals may be the same or different. Letter a is a positive number of 1.5 to 2.8, preferably 1.8 to 2.5, and more preferably 1.95 to 2.05.

Examples of the substituted or unsubstituted monovalent hydrocarbon radical attached to a silicon atom represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted ones of the foregoing radicals in which some or all of the hydrogen atoms are replaced by halogen atoms (e.g., fluorine, bromine and chlorine) or cyano radicals, such as chloromethyl, chloropropyl, bromoethyl, trifluoropropyl, and cyanoethyl.

At least two of the organic radicals represented by $R^1$ are alkenyl radicals, preferably having 2 to 8 carbon atoms, more preferably 2 to 6 carbon atoms. Preferably the content of alkenyl radicals is 0.001 to 10 mol %, more preferably 0.01 to 5 mol % of the entire radicals $R^1$ in formula (1). It is noted that alkenyl radicals may be attached to silicon atoms at the ends of or midway a molecular chain or both.

The organopolysiloxane essentially has a straight chain structure while it may partially have a branched or cyclic structure. No particular limit is imposed on the molecular weight, that is, any organopolysiloxane ranging from a liquid one having a low viscosity to a gum-like one having a high viscosity is useful. Preferably the organopolysiloxane has a viscosity of at least 100 centipoise, more preferably 100 to 1,000,000 centipoise, and most preferably 500 to 100,000 centipoise at 25° C. in order that it cure into a rubbery elastomer.

Component (B) is an organohydrogenpolysiloxane having at least two, preferably at least three hydrogen atoms each attached to a silicon atom (that is, SiH radicals) in a molecule. The preferred organohydrogenpolysiloxane is of the following average compositional formula (2).

$$R^2_b H_c SiO_{(4-b-c)/2} \tag{2}$$

In formula (2), $R^2$ is a substituted or unsubstituted monovalent hydrocarbon radical of 1 to 10 carbon atoms. The radicals represented by $R^2$ include the same examples as mentioned for $R^1$ in formula (1). Preferably, $R^2$ is an aliphatic unsaturated bond-free radical. Letter b is a positive number of 0.7 to 2.1, c is a positive number of 0.001 to 1.05, and the sum of b+c is from 0.8 to 3.0. Preferably, b is from 1.0 to 2.0, c is from 0.01 to 1.0, and the sum of b+c is from 1.0 to 2.5.

The organohydrogenpolysiloxane should have at least two, preferably 2 to 100, more preferably 3 to 50 silicon atom-attached hydrogen atoms (SiH radicals) in a molecule. Exemplary organohydrogenpolysiloxanes include both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxanedimethylsiloxane copolymers, copolymers of $(CH_3)_2HSiO_{1/2}$ units and $SiO_{4/2}$ units, copolymers of $(CH_3)_2HSiO_{1/2}$ units, $SiO_{4/2}$ units, and $(C_6H_5)SiO_{3/2}$ units, and copolymers of $(CH_3)_2HSiO_{1/2}$ units, $(CH_3)_3SiO_{1/2}$ units, and $SiO_2$ units.

The organohydrogenpolysiloxane is preferably liquid at room temperature and desirably has a viscosity of 0.1 to 1,000 centipoise, more desirably 0.1 to 500 centipoise, and especially 0.5 to 300 centipoise at 25° C. The number of silicon atoms in a molecule is usually about 3 to about 300, preferably about 4 to about 100.

The organohydrogenpolysiloxane (B) is blended in an amount of 0.1 to 50 parts, preferably 0.3 to 30 parts by weight per 100 parts by weight of the organopolysiloxane (A). Differently stated, the organohydrogenpolysiloxane (B) is blended in such an amount that about 0.4 to 5 mol, preferably about 0.8 to 2 mol of silicon atom-attached hydrogen atoms (SiH radicals) in component (B) are available per mol of silicon atom-attached alkenyl radicals in component (A). A too low molar ratio of SiH to alkenyl would lead to a lower crosslinking density and adversely affect the heat resistance of silicone rubber cured. A too high molar ratio of SiH to alkenyl would give rise to an expansion problem due to dehydrogenation reaction and adversely affect the heat resistance.

Component (C) is an addition reaction catalyst which is effective for promoting addition reaction or hydrosilylation reaction between components (A) and (B). Any well-known catalyst may be used. Included are platinum catalysts, for example, platinum black, chloroplatinic acid, alcohol-modified products of chloroplatinic acid, complexes of chloroplatinic acid with olefins, aldehydes, vinylsiloxanes and acetylene alcohols. Other platinum group metal compounds such as rhodium complexes are also useful. The addition reaction catalyst (C) is used in a catalytic amount which may be adjusted depending on the desired curing rate, typically about 0.1 to 1,000 parts, preferably about 1 to 200 parts by weight of platinum group metal (e.g., platinum or rhodium) per million parts by weight of component (A).

To the thermosetting organopolysiloxane composition, other components are added if desired. Exemplary other components include fillers such as microparticulate (or finely divided) silica and calcium carbonate, reinforcing agents such as silicone resins, conductive agents such as carbon black, conductive zinc oxide, ferric oxide, aluminum oxide, titanium oxide, and metallic powder, hydrosilylation reaction controlling agents such as nitrogenous compounds, acetylene compounds, phosphorus compounds, nitrile compounds, carboxylates, tin compounds, mercury compounds and sulfur compounds, heat resistance modifiers such as iron oxide and cerium oxide, internal parting agents such as dimethylsilicone oil, tackifiers, and thixotropic agents. The finely divided silica includes fumed silica and precipitated silica which have a specific surface area by BET adsorption method of about 50 m²/g or more, especially about 50 to 400 m²/g, and fused silica, pulverized silica and crystalline silica (quartz powder) which have a mean particle size of about 0.1 to 50 μm, especially about 0.2 to 20 μm. Examples of the finely divided silica having a specific surface area of 50 m$^2$/g or more include Aerosil 130, 200 and 300 (commercially available from Japan Aerosil Co., Ltd. and Degussa), Cabosil MS-5 and MS-7 (commercially available from Cabot), Rheorosil QS-102 and 103 (commercially available from Tokuyama Soda Co., Ltd.), and Nipsil LP (commercially available from Japan Silica Co., Ltd.) as hydrophilic silicas, and Aerosil R-812, R-812S, R-972 and R-974 (commercially available from Degussa), Rheorosil MT-10 (commercially available from Tokuyama Soda Co., Ltd.), and Nipsil SS series (commercially available from Japan Silica Co., Ltd.) as hydrophobic silicas.

According to the invention, the hollow filler is blended in the thermosetting organopolysiloxane composition to formulate a silicone rubber composition which is suitable for forming a heat fixing roll. In connection with a heat fixing roll comprising a roll shaft, a silicone rubber layer formed on the outer circumferential surface of the shaft, and optionally a fluoro-resin layer surrounding the silicone rubber layer, the silicone rubber composition of the invention is effective for forming the silicone rubber layer.

While the silicone rubber composition must be cured in order to form the silicone rubber layer, the curing conditions are not critical. In general, the composition is heat cured at about 100 to 150° C. for about 10 minutes to one hour and post-cured at about 180 to 200° C. for about 2 to 4 hours.

When the silicone rubber composition is cured, the cured product or silicone rubber should preferably have a heat conductivity of up to $5.0 \times 10^{-4}$ cal/cm·sec·° C., more preferably $1.0 \times 10^{-5}$ to $5.0 \times 10^{-4}$ cal/cm·sec·° C., most preferably $5.0 \times 10^{-5}$ to $4.5 \times 10^{-4}$ cal/cm·sec·° C. It is recommended to adjust the formulation of components so as to achieve a heat conductivity within this range. The objects of the invention are sometimes unattainable with a heat conductivity beyond $5.0 \times 10^{-4}$ cal/cm·sec·° C.

In the heat fixing roll, the silicone rubber layer preferably has a (radial) thickness of 0.1 to 80 mm, especially 0.2 to 50 mm, but is not limited thereto.

In one preferred embodiment, the fluoro-resin layer is formed around the silicone rubber layer, using a fluoro-resin coating composition or a fluoro-resin tube. The fluoro-resin coating agent used herein is, for example, a latex of polytetrafluoroethylene resin (PTFE) or Dyel Latex (fluorochemical latex by Daikin Industry K.K.). Useful fluoro-resin tubes are commercially available, for example, tubes of polytetrafluoroethylene resin (PTFE), tetrafluoroethylene-perfluoroalkyl vinyl ether copolymer resin (PFA), ethylene fluoride-polypropylene copolymer resin (FEP), polyvinylidene fluoride resin (PVDF) and polyvinyl fluoride resin (PVF). Of these, the tetrafluoroethyleneperfluoroalkyl vinyl ether copolymer resin (PFA) is most preferred.

Preferably the surface of the silicone rubber layer to come in contact with the fluoro-resin coating composition or fluoro-resin tube or the surface of the fluoro-resin tube is pretreated so as to enhance the adhesion therebetween, for example, by corona discharge treatment, sodium naphthalene, sputter etching, or liquid ammonia process. Primer treatment is also effective for improving durable adhesion.

The fluoro-resin layer preferably has a thickness of 0.1 to 100 μm, especially 1 to 50 μm although any suitable thickness may be properly selected.

The roll shaft may be made of a suitable metal such as iron, aluminum or stainless steel.

EXAMPLE

Examples of the invention are given below by way of illustration and not by way of limitation. All parts are by weight.

Example 1

In a planetary mixer were admitted 100 parts of a side chain vinyl radical-containing dimethylpolysiloxane (degree of polymerization 700, vinyl value 0.0094 mol/100 g), 5 parts of hydrophobic fumed silica having a specific surface area of 110 m$^2$/g as measured by the BET adsorption method (R-972 by Nippon Aerosil K.K.), and 4 parts (corresponding to 49% by volume based on the entire composition) of a thermoplastic resin hollow filler having a specific gravity of 0.04 and a mean particle size of 40 μm (Expancel DE by Expancel Co.). The mixer was operated for 30 minutes for admixing the ingredients. Further, 3.8 parts of methylhydrogenpolysiloxane A having Si—H radicals at both ends and side chains (degree of polymerization 17, Si—H content 0.0030 mol/g) as a crosslinking agent and 0.05 part of ethynyl cyclohexanol as a reaction control agent were added to the mixer where agitation was continued for a further 15 minutes, obtaining a silicone rubber composition (1). To the silicone rubber composition (1), 0.1 part of a platinum catalyst (Pt concentration 1%) was added and mixed. The composition was molded into sheets of 2 mm and 6 mm thick by press curing at 120° C. for 10 minutes. The 2-mm sheet was measured for specific gravity and hardness (JIS K-6301 A scale). The 6-mm sheet was measured for heat conductivity. The results are shown in Table 1.

Example 2

In a planetary mixer were admitted 50 parts of a side chain vinyl radical-containing dimethylpolysiloxane (degree of polymerization 700, vinyl value 0.0094 mol/100 g), 50 parts of a dimethylpolysiloxane which is blocked with a dimethylvinylsiloxy radical at each end (degree of polymerization 500), 5 parts of hydrophobic fumed silica having a specific surface area of 110 m$^2$/g (R-972 by Nippon Aerosil K.K.), and 4 parts (corresponding to 65% by volume based on the entire composition) of a thermoplastic resin hollow filler having a specific gravity of 0.02 and a mean particle size of 90 μm (Microsphere F-80ED by Matsumoto Oil and Fats K.K.). The mixer was operated for 30 minutes for admixing the ingredients. Further, 3.5 parts of methylhydrogenpolysiloxane A used in Example 1 as a crosslinking agent and 0.05 part of ethynyl cyclohexanol as a reaction control agent were added to the mixer where agitation was continued for a further 15 minutes, obtaining a silicone rubber composition (2). To the silicone rubber composition (2), 0.1 part of a platinum catalyst (Pt concentration 1%) was added and mixed. The composition was molded into test sheets, which were measured for specific gravity, hardness, and heat conductivity as in Example 1. The results are shown in Table 1.

Example 3

In a planetary mixer were admitted 50 parts of a side chain vinyl radical-containing dimethylpolysiloxane (degree of polymerization 700, vinyl value 0.0094 mol/100 g), 50 parts of a dimethylpolysiloxane which is blocked with a dimethylvinylsiloxy radical at each end (degree of polymerization 500), 5 parts of fumed silica having a specific surface area of 200 m$^2$/g (Aerosil 200 by Nippon Aerosil K.K.), and 30 parts (corresponding to 45% by volume based on the entire composition) of a glass hollow filler having a specific gravity of 0.35 and a mean particle size of 56 μm (Cellstar Z-36 by Tokai Industry K.K.). The mixer was operated for 30 minutes for admixing the ingredients. Further, 3.5 parts of methylhydrogenpolysiloxane A used in Example 1 as a crosslinking agent and 0.05 part of ethynyl cyclohexanol as a reaction control agent were added to the mixer where agitation was continued for a further 15 minutes, obtaining a silicone rubber composition (3). To the silicone rubber composition (3), 0.1 part of a platinum catalyst (Pt concentration 1%) was added and mixed. The composition was molded into test sheets, which were measured for specific gravity, hardness, and heat conductivity as in Example 1. The results are shown in Table 1.

Example 4

In a planetary mixer were admitted 50 parts of a side chain vinyl radical-containing dimethylpolysiloxane (degree of polymerization 700, vinyl value 0.0094 mol/100 g), 50 parts of a dimethylpolysiloxane which is blocked with a dimethylvinylsiloxy radical at each end (degree of polymerization 500), 5 parts of fumed silica having a specific surface area of 200 m$^2$/g (Aerosil 200 by Nippon Aerosil K.K.), and 60 parts (corresponding to 62% by volume based on the entire composition) of a glass hollow filler having a specific gravity of 0.35 and a mean particle size of 56 μm (Cellstar Z-36 by Tokai Industry K.K.). The mixer was operated for 30 minutes for admixing the ingredients. Further, 3.5 parts of methylhydrogenpolysiloxane A used in Example 1 as a crosslinking agent and 0.05 part of ethynyl cyclohexanol as a reaction control agent were added to the mixer where agitation was continued for a further 15 minutes, obtaining a silicone rubber composition (4). To the silicone rubber composition (4), 0.1 part of a platinum catalyst (Pt concentration 1%) was added and mixed. The composition was molded into test sheets, which were measured for specific gravity, hardness, and heat conductivity as in Example 1. The results are shown in Table 1.

Comparative Example 1

In a planetary mixer were admitted 100 parts of a side chain vinyl radical-containing dimethylpolysiloxane (degree of polymerization 700, vinyl value 0.0094 mol/100 g) and 5 parts of hydrophobic fumed silica having a specific surface area of 110 m$^2$/g (R-972 by Nippon Aerosil K.K.). The mixer was operated for 30 minutes for admixing the ingredients. Further, 3,8 parts of methylhydrogenpolysiloxane A used in Example 1 as a crosslinking agent and 0.05 part of ethynyl cyclohexanol as a reaction control agent were added to the mixer where agitation was continued for a further 15 minutes, obtaining a silicone rubber composition (5). To the silicone rubber composition (5), 0.1 part of a platinum catalyst (Pt concentration 1%) was added and mixed. The composition was molded into test sheets, which were measured for specific gravity, hardness, and heat conductivity as in Example 1. The results are shown in Table 1.

Comparative Example 2

In a planetary mixer were admitted 50 parts of a side chain vinyl radical-containing dimethylpolysiloxane (degree of polymerization 700, vinyl value 0.0094 mol/100 g), 50 parts of a dimethylpolysiloxane which is blocked with a dimethylvinylsiloxy radical at each end (degree of polymerization 500), 5 parts of fumed silica having a specific surface area of 200 m$^2$/g (Aerosil 200 by Nippon Aerosil K.K.), and 40 parts of a crystalline quartz filler having a specific gravity of 2.7 and a mean particle size of 4 μm (Crystallite VX-S by Tatsumori K.K.). The mixer was operated for 30 minutes for admixing the ingredients. Further, 3.5 parts of methylhydrogenpolysiloxane A used in Example 1 as a crosslinking agent and 0.05 part of ethynyl cyclohexanol as a reaction control agent were added to the mixer where agitation was continued for a further 15 minutes, obtaining a silicone rubber composition (6). To the silicone rubber composition (6), 0.1 part of a platinum catalyst (Pt concentration 1%) was added and mixed. The composition was molded into test sheets, which were measured for specific gravity, hardness, and heat conductivity as in Example 1. The results are shown in Table 1.

TABLE 1

| | E1 | E2 | E3 | E4 | CE1 | CE2 |
|---|---|---|---|---|---|---|
| Specific gravity | 0.51 | 0.49 | 0.75 | 0.61 | 1.00 | 1.26 |
| Hardness | 18 | 16 | 36 | 48 | 20 | 31 |
| Heat conductivity (cal/cm · sec · °C.) | 2.1 × 10$^{-4}$ | 1.9 × 10$^{-4}$ | 3.6 × 10$^{-4}$ | 3.1 × 10$^{-4}$ | 5.2 × 10$^{-4}$ | 1.2 × 10$^{-3}$ |

Example 5

A primer No. 101A/B for addition reaction type liquid silicone rubber (by Shin-Etsu Chemical Industry Co., Ltd.) was applied to the circumferential surface of an aluminum shaft having a diameter of 24 mm and a length of 300 mm. The shaft was inserted into a fluoroplastic PFA tube with a gage of 50 μm which had been treated on its inner surface with the primer. The silicone rubber composition (1) of Example 1 was introduced between the tube and the shaft, heat cured at 150° C. for 30 minutes and post cured at 180° C. for 2 hours. There was obtained a PFA resin-covered silicone rubber roll having an outer diameter of 26 mm and a length of 250 mm.

After the roll was taken out of the oven at 180° C., it was allowed to stand at room temperature (25° C.) for 2 minutes. The temperature at the roll surface was 75° C. at this point of time. The roll was incorporated in a PPC copier as the fixing roll whereupon the copier was normally operated to duplicate 10,000 sheets. The copier was further operated with the heater for the heating roll turned off. Duplication could still be continued on 60 sheets of paper in good conditions. It was confirmed that without external supply of heat, the heat fixing roll continued stable performance.

Example 6

A primer No. 101A/B for addition reaction type liquid silicone rubber (by Shin-Etsu Chemical Industry Co., Ltd.) was applied to the circumferential surface of an aluminum shaft having a diameter of 24 mm and a length of 300 mm. The silicone rubber composition (1) of Example 1 was applied thereto, heat cured at 150° C. for 30 minutes and post cured at 180° C. for 2 hours. Dyel Latex and a primer GLP-103SR for silicone rubber (Daikin Industry K.K.) were uniformly applied to the surface of the cured silicone rubber and heated at 80° C. for 10 minutes, following which Dyel Latex GLS-213 was uniformly spray coated thereon and fired at 300° C. for one hour. There was obtained a Dyel Latex coated silicone rubber roll having a diameter of 26 mm and a length of 250 mm.

After the roll was taken out of the oven at 180° C., it was allowed to stand at room temperature (25° C.) for 2 minutes. The temperature at the roll surface was 72° C. at this point of time. The roll was incorporated in a PPC copier as the fixing roll whereupon the copier was normally operated to duplicate 10,000 sheets. The copier was further operated with the heater for the heating roll turned off. Duplication could still be continued on 60 sheets of paper in good conditions. It was confirmed that without external supply of heat, the heat fixing roll continued stable performance.

Example 7

A primer No. 101A/B for addition reaction type liquid silicone rubber (by Shin-Etsu Chemical Industry Co., Ltd.) was applied to the circumferential surface of an aluminum shaft having a diameter of 24 mm and a length of 300 mm. The aluminum shaft was placed in a mold. The mold cavity was filled with the silicone rubber composition (4) of Example 4, which was heat cured at 150° C. for 30 minutes and post cured at 180° C. for 2 hours. There was obtained a silicone rubber roll having a diameter of 26 mm and a length of 250 mm.

After the roll was taken out of the oven at 180° C., it was allowed to stand at room temperature (250° C.) for 2 minutes. The temperature at the roll surface was 65° C. at this point of time. The roll was incorporated in a PPC copier as the fixing roll whereupon the copier was normally operated to duplicate 10,000 sheets. The copier was further operated with the heater for the heating roll turned off. Duplication could still be continued on 50 sheets of paper in good conditions. It was confirmed that without external supply of heat, the heat fixing roll continued stable performance.

Comparative Example 3

A primer No. 101A/B for addition reaction type liquid silicone rubber (by Shin-Etsu Chemical Industry Co., Ltd.) was applied to the circumferential surface of an aluminum shaft having a diameter of 24 mm and a length of 300 mm. The shaft was inserted into a fluoroplastic PFA tube with a gage of 50 $\mu$m which had been treated on its inner surface with the primer. The silicone rubber composition (5) of Comparative Example 1 was introduced between the tube and the shaft, heat cured at 150° C. for 30 minutes and post cured at 180° C. for 2 hours. There was obtained a PPA resin-covered silicone rubber roll having an outer diameter of 26 mm and a length of 250 mm.

After the roll was taken out of the oven at 180° C., it was allowed to stand at room temperature (25° C.) for 2 minutes. The temperature at the roll surface was 58° C. at this point of time. This indicates that the roll of this comparative example has greater heat dissipation than the rolls within the scope of the invention. The roll was incorporated in a PPC copier as the fixing roll whereupon the copier was normally operated to duplicate 10,000 sheets. The copier was further operated with the heater for the heating roll turned off. At the 36th sheet of paper, oozing due to short fixation was found.

Comparative Example 4

A primer No. 101A/B for addition reaction type liquid silicone rubber (by Shin-Etsu Chemical Industry Co., Ltd.) was applied to the circumferential surface of an aluminum shaft having a diameter of 24 mm and a length of 300 mm. The shaft was inserted into a fluoroplastic PFA tube with a gage of 50 $\mu$m which had been treated on its inner surface with the primer. The silicone rubber composition (6) of Comparative Example 2 was introduced between the tube and the shaft, heat cured at 150° C. for 30 minutes and post cured at 180° C. for 2 hours. There was obtained a PFA resin-covered silicone rubber roll having an outer diameter of 26 mm and a length of 250 mm.

After the roll was taken out of the oven at 180° C., it was allowed to stand at room temperature (250° C.) for 2 minutes. The temperature at the roll surface was 52° C. at this point of time. This indicates that the roll of this comparative example has greater heat dissipation than the rolls within the scope of the invention. The roll was incorporated in a PPC copier as the fixing roll whereupon the copier was normally operated to duplicate 10,000 sheets. The copier was further operated with the heater for the heating roll turned off. At the 29th sheet of paper, oozing due to short fixation was found.

There has been described a silicone rubber composition which cures into silicone rubber having a low heat conductivity. The silicone rubber has increased heat insulation, minimized heat dissipation and improved energy saving and contributes to a size reduction. A heat fixing roll made of the silicone rubber is effective for reducing the size and cost of a fixing apparatus.

Japanese Patent Application No. 10-316055 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-foamable silicone rubber composition in a heat-fixing roll comprising
   100 parts by weight of a thermosetting organopolysiloxane composition and
   0.1 to 200 parts by weight of a non-expandable hollow filler having a mean particle size of up to 200 $\mu$m.

2. The silicone rubber composition of claim 1 wherein the thermosetting organopolysiloxane composition contains as main components,
   (A) 100 parts by weight of an organopolysiloxane containing at least two alkenyl groups each attached to a silicon atom in a molecule,
   (B) 0.1 to 50 parts by weight of an organohydrogenpolysiloxane containing at least two hydrogen atoms each attached to a silicon atom in a molecule, and
   (C) 0.1 to 1000 parts by weight of a platinum group metal per million parts by weight of component (A) as an addition reaction catalyst.

3. The silicone rubber composition of claim 1 which has a heat conductivity of up to $5.0 \times 10^{-4}$ cal/cm·sec·° C. when cured.

4. The silicone rubber composition of claim 1 wherein the hollow filler has a true specific gravity of up to 0.5.

5. A heat-fixing roll comprising a roll shaft and a silicone rubber layer formed on the outer circumferential surface of the shaft, the silicone rubber layer being a cured product of the silicone rubber composition of claim 1.

6. A heat-fixing roll comprising a roll shaft, a silicone rubber layer formed on the outer circumferential surface of the shaft, and a fluoro-resin layer surrounding the silicone rubber layer, the silicone rubber layer being a cured product of the silicone rubber composition of claim 1.

7. The silicone rubber composition of claim 1 wherein the hollow filler is a member selected from the group consisting of glass balloons, silica balloons, carbon balloons, alumina balloons, zirconia balloons, siliceous balloons, and plastic balloons.

8. The silicone rubber composition of claim 7 wherein the hollow filler is a member selected from the group consisting of homopolymers of vinylidene chloride, acrylonitrile, methacrylonitrile, an acrylate, a methacrylate, and copolymers of two or more of these monomers.

9. The silicone rubber composition of claim 1 comprising 0.5 to 100 parts by weight of the hollow filler per 100 parts by weight of the thermosetting organopolysiloxane composition.

10. The silicone rubber composition of claim 1 wherein the hollow filler has a mean particle size of 20 $\mu$m to 90 $\mu$m.

11. The silicone rubber composition of claim 1 wherein the hollow filler comprises 10 to 80% by volume of the silicone rubber composition.

* * * * *